United States Patent
Lee

(10) Patent No.: US 10,460,726 B2
(45) Date of Patent: Oct. 29, 2019

(54) LANGUAGE PROCESSING METHOD AND APPARATUS

(71) Applicant: SAMSUNG ELECTRONICS CO., LTD., Suwon-si (KR)

(72) Inventor: Jihyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 15/426,727

(22) Filed: Feb. 7, 2017

(65) Prior Publication Data

US 2017/0372696 A1 Dec. 28, 2017

(30) Foreign Application Priority Data

Jun. 28, 2016 (KR) .................. 10-2016-0080955

(51) Int. Cl.
- *G10L 15/197* (2013.01)
- *G10L 15/02* (2006.01)
- *G10L 15/06* (2013.01)
- *G10L 15/16* (2006.01)
- *G10L 15/183* (2013.01)

(52) U.S. Cl.
CPC ............ *G10L 15/197* (2013.01); *G10L 15/02* (2013.01); *G10L 15/063* (2013.01); *G10L 15/16* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 5,086,439 A * | 2/1992 | Asai ................. | G06T 9/008 341/65 |
| 7,103,544 B2 * | 9/2006 | Mahajan ............. | G10L 15/197 704/240 |
| 7,363,225 B2 * | 4/2008 | Church ............... | G10L 15/197 341/176 |
| 8,015,008 B2 | 9/2011 | Kim et al. | |
| 8,155,956 B2 | 4/2012 | Cho et al. | |
| 8,504,367 B2 | 8/2013 | Shi et al. | |
| 8,606,577 B1 | 12/2013 | Stewart et al. | |
| 9,189,472 B2 * | 11/2015 | Medlock ............ | G06F 3/04883 |
| 9,263,036 B1 | 2/2016 | Graves | |
| 2002/0183997 A1 | 12/2002 | Powell et al. | |
| 2012/0223889 A1 * | 9/2012 | Medlock ............ | G06F 3/04883 345/168 |

(Continued)

FOREIGN PATENT DOCUMENTS

JP 4067776 B2 3/2008
KR 10-2015-0128656 A 11/2015

*Primary Examiner* — Marcus T Riley
(74) *Attorney, Agent, or Firm* — NSIP Law

(57) ABSTRACT

A language processing method and apparatus is disclosed. The language processing method includes obtaining, using an encoder, a first feature vector representing an input word based on an input sequence of first characters included in the input word. The method also generates, using a word estimator, a second feature vector representing a predicted word associated with the input word by processing the first feature vector using a language model, and decodes, using a decoder, the second feature vector to an output sequence of second characters included in the predicted word using the second feature vector.

22 Claims, 12 Drawing Sheets

(56) References Cited

U.S. PATENT DOCUMENTS

| | | |
|---|---|---|
| 2014/0214419 A1 | 7/2014 | Rao et al. |
| 2014/0236578 A1* | 8/2014 | Malon .................... G06F 17/28 704/9 |
| 2014/0249799 A1 | 9/2014 | Yih et al. |
| 2015/0095017 A1 | 4/2015 | Mnih et al. |
| 2017/0372696 A1* | 12/2017 | Lee ........................ G10L 15/02 |

* cited by examiner

**Character-based
Word Encoder-Decoder**

Word-Level Language Model

LANGUAGE PROCESSING METHOD AND APPARATUS

CROSS-REFERENCE TO RELATED APPLICATION(S)

This application claims the benefit under 35 USC § 119(a) of Korean Patent Application No. 10-2016-0080955 filed on Jun. 28, 2016, in the Korean Intellectual Property Office, the entire disclosure of which is incorporated herein by reference for all purposes.

BACKGROUND

1. Field

The following description relates to a language processing method and apparatus.

2. Description of Related Art

A language model refers to a model to calculate a probability that a subsequent word follows in a given sentence based on preceding words. The language model calculates a probability that a sentence actually exists to determine whether the sentence is grammatically or semantically suitable.

The language model may be applied to various fields, such as, for example, voice or speech recognition, question answering (QA), natural language processing, predictive texts, and translation or interpretation. In an open-vocabulary environment, an out-of-vocabulary (OOV), which is a term or a word that is not included in typical or established vocabularies with training data may need to be processed. To process such an OOV, a structural change is inevitable for the language model. In such a case, maintaining a previous structure of the language model may not be easy or possible and a size of the language model may increase. In such an open-vocabulary environment where the number of words to be processed in an application domain is great or a new word is frequently coined, developing a language model that may be effectively applied is desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a language processing method, including: obtaining, using an encoder, a first feature vector representing an input word based on an input sequence of first characters included in the input word; generating, using a word estimator, a second feature vector representing a predicted word associated with the input word by processing the first feature vector using a language model; and decoding, using a decoder, the second feature vector to an output sequence of second characters included in the predicted word using the second feature vector.

Either one or both of the first feature vector and the second feature vector may be a d-dimension real-valued vector formed by a combination of real values, wherein d may be a natural number smaller than a number of words predictable by the language model.

The obtaining of the first feature vector may include: encoding the input sequence to the first feature vector at a neural network of the encoder.

The obtaining of the first feature vector may include: sequentially inputting first vectors representing, respectively, the first characters to an input layer of the neural network of the encoder; and generating the first feature vector based on activation values to be sequentially generated by an output layer of the neural network of the encoder, wherein a dimension of the first feature vector may correspond to a number of nodes of the output layer.

A dimension of a first vector representing a first character, among the first characters, may correspond to either one or both of a number of nodes of an input layer of the neural network of the encoder and a number of types of characters included in a language of the input word.

The neural network of the encoder may include a recurrent neural network, and the obtaining of the first feature vector may include: generating the first feature vector based on the input sequence and an output value previously generated by the recurrent neural network.

The obtaining of the first feature vector may include: obtaining the first feature vector representing the input word from a lookup table in which input sequences and feature vectors corresponding to the input sequences are recorded.

The obtaining of the first feature vector may further include: encoding the input sequence to the first feature vector by inputting the input sequence to a neural network of the encoder.

The predicted word may include a word subsequent to the input word.

A neural network of the language model may include a recurrent neural network, and the generating of the second feature vector may include: generating the second feature vector based on the first feature vector and an output value previously generated by the recurrent neural network.

A dimension of the first feature vector may correspond to a number of nodes of an input layer of a neural network of the language model, and a dimension of the second feature vector may correspond to a number of nodes of an output layer of the neural network of the language model.

A dimension of the second feature vector may correspond to a number of nodes of an input layer of a neural network of the decoder, and a dimension of a second vector representing a second character, among the second characters, may correspond to a number of nodes of an output layer of the neural network of the decoder, wherein the dimension of the second vector may correspond to a number of types of characters included in a language of the predicted word.

The second vector may be generated based on activation values generated by the output layer of the neural network of the decoder, wherein one of the activation values indicates a probability corresponding to the second character.

A neural network of the decoder may include a recurrent neural network, and the decoding may include: generating the output sequence based on the second feature vector and an output value previously generated by the recurrent neural network.

The decoding may include: generating the output sequence based on activation values to be sequentially generated by an output layer of a neural network of the decoder.

In accordance with an embodiment, there is further provided a non-transitory computer-readable storage medium storing instructions that, when executed by a processor, cause the processor to perform the method described above.

In accordance with an embodiment, there is provided a training method, including: processing a training sequence of training characters included in a training word at a neural network of an encoder to produce a training feature vector representing the training word; processing the training feature vector at a neural network of a language model to produce an output feature vector; processing the output feature vector at a neural network of a decoder to produce an output sequence corresponding to the training sequence; and training the neural network of the language model based on a label of the training word and the output sequence.

Either one or both of the training feature vector and the output feature vector may be a d-dimension real-valued vector formed by a combination of real values, wherein d may be a natural number smaller than a number of words predictable by the language model, and the training of the neural network of the language model may include: training the neural network of the language model to represent, through the output feature vector, a predicted word associated with the training word.

The training method may also include: obtaining a second output sequence corresponding to the training sequence by inputting the training feature vector to the neural network of the decoder; and training the neural network of the encoder and the neural network of the decoder based on the label of the training word and the second output sequence.

A training vector included in the training sequence may be a c-dimension one-hot vector, wherein c may be a natural number, and a value of a vector element corresponding to the training character may be 1 and a value of a remaining vector element may be 0, and the training may include: training the neural network of the encoder and the neural network of decoder such that the training sequence and the second output sequence are identical to each other.

In accordance with another embodiment, there is provided a non-transitory computer-readable storage medium storing instructions that, when executed by a processor, cause the processor to perform the method described above.

In accordance with an embodiment, there is provided a language processing apparatus, including: an encoder configured to generate a first feature vector representing an input word based on an input sequence of first characters included in the input word; a word estimator configured to generate a second feature vector representing a predicted word, associated with the input word, based on the first feature vector; and a decoder configured to generate an output sequence of second characters included in the predicted word based on the second feature vector.

Other features and aspects will be apparent from the following detailed description, the drawings, and the claims.

Figure 1:
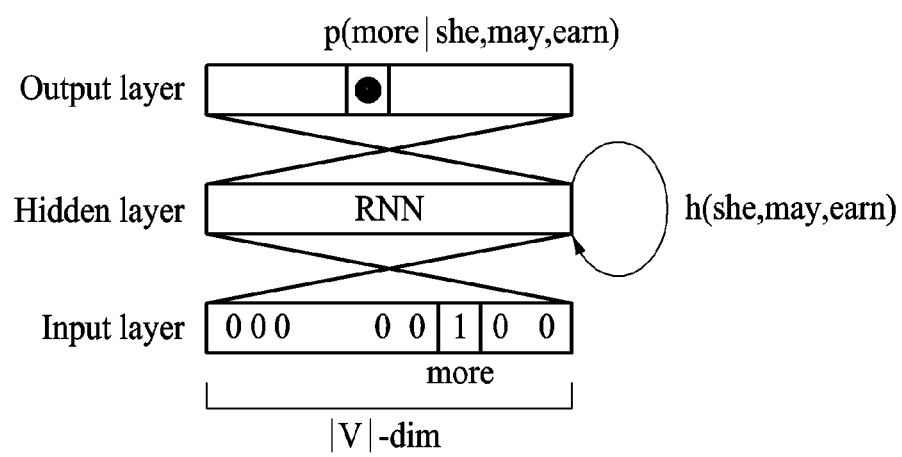
FIG. 1 is a diagram illustrating an example of a configuration of a neural network-based language model, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of the application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Examples to be described hereinafter may be embodied in various forms of products, for example, a personal computer (PC), a laptop computer, a tablet PC, a smartphone, a television (TV), a smart home appliance, an intelligent vehicle, a kiosk, and a wearable device. The examples may be applicable to user recognition in, for example, a smartphone, a mobile device, and a smart home system. In addition, the examples may be applicable to a payment service based on user recognition. Further, the examples may also be applicable to a smart vehicle system that is automatically started through user recognition. Hereinafter, example embodiments are described in detail with reference to the accompanying drawings. Like reference numerals in the drawings denote like elements, and a known function or configuration will be omitted herein.

FIG. 1 is a diagram illustrating an example of a configuration of a neural network-based language model, in accordance with an embodiment.

A language model is configured to measure a probability that a sentence exists in an actual life. The language model models a linguistic sequence of words or syllables corresponding to recognition vocabulary. For example, the language model measures a degree of grammatical or semantic correctness of a given sentence, and scores the measured degree of correctness. In addition, the language model generates a new sentence. For example, the language model estimates a subsequent word to generate a new sentence based on a given word or sentence and by determining the subsequent word through sampling in a probability distribution of estimated words.

An example of the language model may be an n-gram model. The n-gram model calculates a probability of an n-th word based on preceding n−1 words in a given sentence. In one example, a context to be considered to predict the probability of the word is restricted to the n−1 words. For example, as shown in FIG. 1, when a sentence "she may earn more money" is given, a probability of a word "money" may be calculated to be P(money|more) by using a 2-gram model. In the n-gram model, a longer context model may need to be considered for more accurate prediction of a word.

In comparison to the n-gram model, a neural network-based language model is not restricted by a length of a context to be considered to predict a probability of a word. A representative example of such a neural language model is a recurrent neural network language model (RNNLM) based on a recurrent neural network (RNN). In a general neural network structure, an input and an output are independent from each other. However, the RNN has a neural network structure in which previous outputs affect a result of calculating a new output. For the language model, an effectiveness of predicting a subsequent word is improved by fully considering previously predicted words and, thus, adopting the RNN may be suitable for the language model.

When a t-th word is input, the RNNLM predicts a t+1th word and output the predicted word. Previously input words including a t−1th word is applied as hidden state values of a hidden layer of the RNNLM through a recurrent connection of the hidden layer of the RNNLM. Thus, the t+1th word is predicted based on the hidden state values of the words including the t−1th word and on the currently input t-th word. Thus, dissimilar to the n-gram model, the RNNLM does not have a restriction on a length of a context to be considered.

Referring to FIG. 1, in an example sentence "she may earn more money," a probability of a word "money" is determined to be P(money|she, may, earn, more) by the RNNLM. In another example sentence "he not only read the book, but also recommended what he had read," a 3-gram model considers only "the book" to predict a probability of a seventh word "but." In contrast, the RNNLM considers all preceding words including "not only" to predict the seventh word "but." That is, the RNNLM obtains a more accurate probability compared to the n-gram model because the RNNLM considers a context without a restriction on a length of the context.

As illustrated in FIG. 1, an input of the RNNLM may be a one-hot vector of dimension |V|. In one example, V denotes a vocabulary that is processible by the RNNLM, and the |V| dimension one-hot vector refers to a vector in which a value of a vector element corresponding to a word to be input is 1 and a value of a remaining vector element is 0. An output of the RNNLM is a real-valued vector of dimension |V|, in which a value of each real-valued vector indicates a probability distribution of a corresponding word. When a dimension of the input and the output of the RNNLM is fixed, an out-of-vocabulary (OOV) that is not included in vocabularies with training data may not be processible. When a vocabulary scope is expanded by, for example, adding a new word, a structure of a model may need to change and, thus, maintaining the existing model may not be easy. In addition, when |V| increases, for example, to be one million words, a size and an operation time of the model may also increase.

As described hereinafter, a word embedding model using a character-based encoder and decoder (encoder-decoder) may be provided herein. By the character-based encoder-decoder, a feature vector representing a word is generated, and the RNNLM is established based on the generated feature vector. A neural network model in which the character-based encoder-decoder and the RNNLM are integrated may be embodied and, thus, a neural language model in which a feature of a character-based model and a feature of a word-based model are combined may be provided. The neural language model provides word prediction based on a relationship between a character-unit input and output and a word and, as a result, it is effectively applied to an open-vocabulary environment.

A language processing method described herein is performed by a language processing apparatus described herein. The language processing apparatus is a structural or hardware configuration.

Figure 2A:
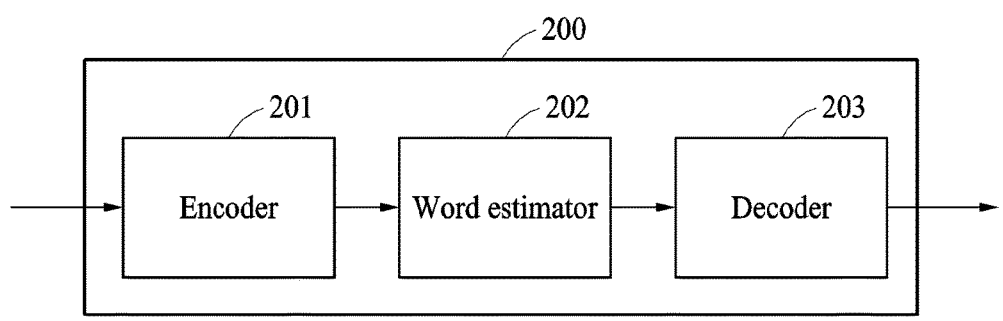
FIGS. 2A and 2B are diagrams illustrating examples of a language processing apparatus, in accordance with an embodiment.
Figure 2B:
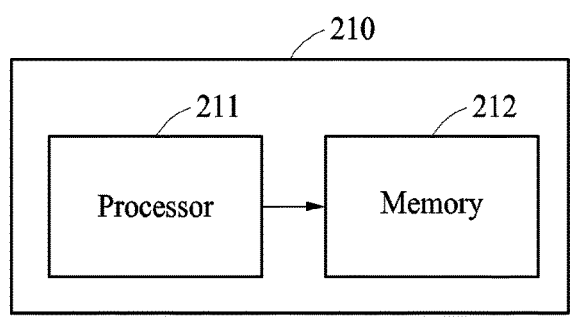

FIGS. 2A and 2B are diagrams illustrating examples of a language processing apparatus, in accordance with an embodiment.

Referring to FIG. 2A, a language processing apparatus 200 includes an encoder 201, a word estimator 202, and a decoder 203. The encoder 201 generates a feature vector representing a word based on a sequence of characters included in the word. For example, the encoder 201 receives, as an input, a sequence of characters included in a word "more," for example, "m," "o," "r," and "e," and generates a feature vector representing the word "more" based on the input sequence. The encoder 201 receives the input sequence of characters through an input layer of a neural network, and generates the feature vector representing an input word through an output layer of the neural network. Alternatively, the encoder 201 generates the feature vector representing the input word based on a pre-established lookup table. That is, the encoder 201 encodes a sequence of characters to a feature vector using the neural network, or obtains the feature vector corresponding to the sequence of characters based on the lookup table.

The word estimator 202 inputs the feature vector generated by the encoder 201 to a neural network of a language model and generates a feature vector representing a predicted word. For example, when a feature vector representing a word "more" is generated by the encoder 201, the word estimator 202 generates a feature vector representing a predicted word "money" that is associated with the word "more." That is, when the feature vector representing the word "more" is input to an input layer of an RNNLM of the word estimator 202, a probability value of the predicted word "money" is generated by an output layer of the RNNLM based on hidden state values of the RNNLM, for example, values representing "she," "may," and "earn," and on the feature vector representing the currently input word "more." The word estimator 202 generates the feature vector representing the predicted word associated with the input word based on output values generated by the output layer of the RNNLM.

The decoder 203 receives the feature vector and inputs the feature vector representing the predicted word to a neural network and decodes the feature vector into a sequence of characters. The decoder 203 receives the feature vector representing the predicted word from the word estimator 202, inputs the received feature vector to the neural network, and generates an output sequence of characters, such as alpha characters, included in the predicted word. For example, when the feature vector representing the word "money" is transferred from the word estimator 202 to the decoder 203, the decoder 203 inputs the feature vector representing the word "money" to the neural network, and decodes the input feature vector to a sequence of characters, such as alpha characters, "m," "o," "n," "e," and "y."

As described above, using the language processing apparatus 200 in which the encoder 201, the word estimator 202, and the decoder 203 are combined to execute a language model, the language processing apparatus 200 receives a sequence of characters included in an input word, estimates a predicted word associated with the input word, and generates a sequence of characters included in the estimated predicted word. In accord with an embodiment, although not shown, additional structural processors, in addition to those shown in FIG. 1, may be further implemented within each of the language processing apparatus 200, the encoder 201, the word estimator 202, and the decoder 203. Also, although the encoder 201 and the decoder 203 are shown as part of the language processing apparatus 200, in another embodiment, the encoder 201 and the decoder 203 may be external to the language processing apparatus 200, while operating and exchanging information with other structural elements of the language processing apparatus 200. The language processing apparatus 200 includes a structure of a model independent from a vocabulary size through an input and output performed by a character unit. As a result, the language processing apparatus 200 reduces an operation time of the model. In addition, the language processing apparatus 200 dynamically, without user intervention, adapts the model to an OOV environment without a structural change in the model despite an addition of a new word. The language processing apparatus 200 predicts a word by a word unit, facilitates pattern training that is significant between words, and improves a probability for more accurate word estimation based on an overall context.

Referring to FIG. 2B, a language processing apparatus 210 includes a processor 211 and a memory 212. The memory 212 records a program that executes a language processing method to be later described. The processor 211 loads the program recorded in the memory 212 and perform the language processing method. In addition, the memory 212 records or stores a trained neural network of the encoder 201 or a lookup table, and a trained neural network of the word estimator 202 and a trained neural network of the decoder 203. The processor 211 generates a sequence of characters included in a predicted word associated with an input word, using a sequence of characters included in the input word and information pre-recorded in the memory 212.

In an embodiment, a neural language network in which the encoder 201, the decoder 203, and the word estimator 202 are integrated may be provided in a form of the trained three neural networks combined into a single trained neural network. A neural network applied to the encoder 201 is herein referred to as a neural network of the encoder 201 or an encoder neural network, and a neural network applied to the decoder 203 is herein referred to as a neural network of the decoder 203 or a decoder neural network. A neural network applied to the word estimator 202 is herein referred to as a neural network of a language model or a language model neural network. In an alternative embodiment, the encoder 201 includes and uses a lookup table in lieu of the encoder neural network, and an example of using the lookup table will be described with reference to FIG. 12.

Hereinafter, an example of a training method of a language processing apparatus will be described with reference to FIGS. 3 through 7. A training process of the encoder 201 and the decoder 203 will be described with reference to FIGS. 3 and 4. A training process of a language model neural network of the word estimator 202 will be described with reference to FIGS. 5 and 6. A structure in which the trained encoder 201, the trained word estimator 202, and the trained decoder 203 are integrated will be described with reference to FIG. 7.

Further, an example of a language processing method will be described with reference to FIGS. 8 through 12. A flow of operations of the language processing method will be described with reference to FIG. 8. A structure of the encoder 201 and the decoder 203 will be described with reference to FIG. 9. A structure of a language model neural network of the word estimator 202 will be described with reference to FIG. 10. An example of a language processing method using a structure in which the encoder 201, the word estimator 202, and the decoder 203 are integrated will be described with reference to FIG. 11. An example of using a lookup table in lieu of an encoder neural network will be described with reference to FIG. 12.

Figure 3:
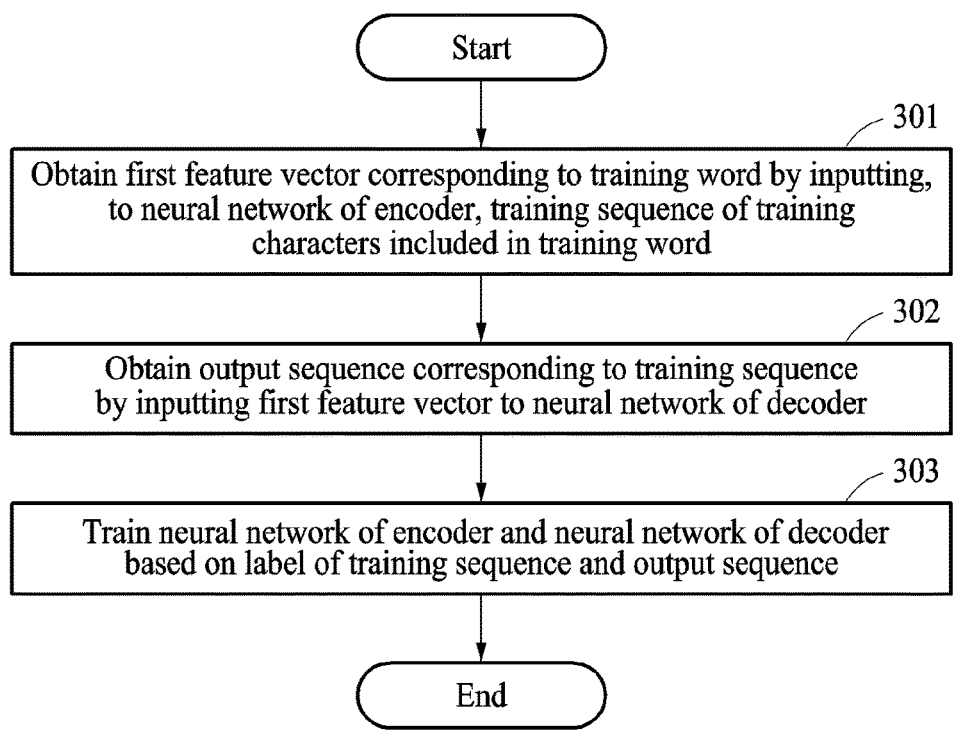
FIG. 3 is a flowchart illustrating an example of a training process of an encoder and a decoder, in accordance with an embodiment.

FIG. 3 is a flowchart illustrating an example of a training process of an encoder and a decoder, in accordance with an embodiment.

Referring to FIG. 3, in operation 301, in a training method of a language processing apparatus, the language processing apparatus obtains a first feature vector corresponding to a training word by inputting, to a neural network of an encoder, a training sequence of training characters included in the training word. A training vector representing a training character included in the training word may be a one-hot vector of dimension c, in which c denotes a natural number. Among values of the training vector, a value of a vector element corresponding to the training character may be 1, and a value of a remaining vector element may be 0. For example, for a particular language, such as Korean, English, or Spanish, when the number of types of characters of the training word is c, the training character included in the training sequence is represented as a c-dimension training vector. For example, when training word is in English, the training character is a 26-dimension one-hot vector because the number of types of English characters, for example, alphabet letters a through z, is 26. In an example, when the training word is "more," the training characters are "m," "o," "r," and "e," and a sequence of training vectors representing the training characters is input to the neural network of the encoder. The training vectors representing respectively the training characters "m," "o," "r," and "e," are defined in a form of a one-hot vector as follows.

"m"→(0,0,0,0,0,0,0,0,0,0,0,0,1,0,0,0,0,0,0,0,0,0,0,0,0,0),
"o"→(0,0,0,0,0,0,0,0,0,0,0,0,0,0,1,0,0,0,0,0,0,0,0,0,0,0),
"r"→(0,0,0,0,0,0,0,0,0,0,0,0,0,0,0,0,0,1,0,0,0,0,0,0,0,0), and
"e"→(0,0,0,0,1,0,0,0,0,0,0,0,0,0,0,0,0,0,0,0,0,0,0,0,0,0)

When the sequence of the characters "m," "o," "r," and "e" is input to an input layer of the neural network of the encoder, a first feature vector representing the word "more" is obtained from an output layer of the neural network of the encoder. In an embodiment, a dimension of the input layer of the neural network of the encoder corresponds to a dimension of the training vector. For example, when the training word is in English and the training vector is a 26-dimension one-hot vector, the dimension of the input layer of the neural network of the encoder is 26 dimensions and the number of nodes of the input layer is 26. In addition, the first feature vector representing the word "more" may be a real-valued vector, and a dimension of the first feature vector may correspond to a dimension of the output layer of the neural network of the encoder. The number of nodes in the output layer of the neural network of the encoder may correspond to the dimension of the first feature vector.

The neural network of the encoder may be an RNN. Thus, to obtain the first feature vector through the neural network of the encoder, the training sequence and output values previously generated by the RNN may be used. In this example, the first feature vector representing the word "more" is generated based on hidden state values of the RNN of the encoder based on a sequential input of "m," "o," and "r," and on a training vector of "e" that is lastly input.

In operation 302, the language processing apparatus obtains an output sequence corresponding to the training sequence by inputting the obtained first feature vector to a neural network of a decoder. For example, the first feature vector obtained from the output layer of the neural network of the encoder is input to an input layer of the neural network of the decoder. In an embodiment, a dimension of the input layer of the neural network of the decoder corresponds to the dimension of the first feature vector. For example, the number of nodes in the input layer of the neural network of the decoder corresponds to the dimension of the first feature vector. In addition, the dimension of the output layer of the neural network of the encoder corresponds to the dimension of the input layer of the neural network of the decoder. The dimension of the output layer of the neural network of the decoder corresponds to the dimension of the training vector. For example, when the training word is in English and the training vector is a 26-dimension one-hot vector, the dimension of the output layer of the neural network of the decoder is 26 dimensions, and the number of nodes in the output layer is 26. The nodes in the output layer of the neural network of the decoder generate a probability value of a character corresponding to each node.

The neural network of the decoder may be an RNN. Thus, to obtain the output sequence through the neural network of the decoder, the first feature vector and output values previously generated by the RNN may be used. For example, the output sequence is generated based on the first feature vector representing the word "more" and hidden state values of the RNN of the decoder.

In operation 303, the language processing apparatus trains the neural network of the encoder and the neural network of the decoder based on a label of the training word of the encoder, for example, a label of the input training sequence, and the output sequence obtained from the decoder. The label of the training sequence may be modified or dynamically varied to be suitable to a particular configuration and accordingly defined. For example, when a sequence of characters "m," "o," "r," and "e" is the training sequence, the label of the training sequence may be defined as a one-hot vector representing each of the characters "m," "o," "r," and "e," identically to the training vectors. In the training method, the language processing apparatus trains the neural network of the encoder and the neural network of the decoder such that the output sequence and the training sequence are to be identical to each other. That is, weighted values between the nodes in the neural network of the encoder and the nodes in the neural network of the decoder, a connection relationship between the nodes, and other characteristics or factors may be optimized such that activation values to be sequentially generated by the output layer of the neural network of the decoder are identical to or substantially the same as the training vectors to be sequentially input to the input layer of the neural network of the encoder. In the training method of the language processing apparatus, an encoder and a decoder that are trained through the operations described with reference to FIG. 3 may be established.

Figure 4:
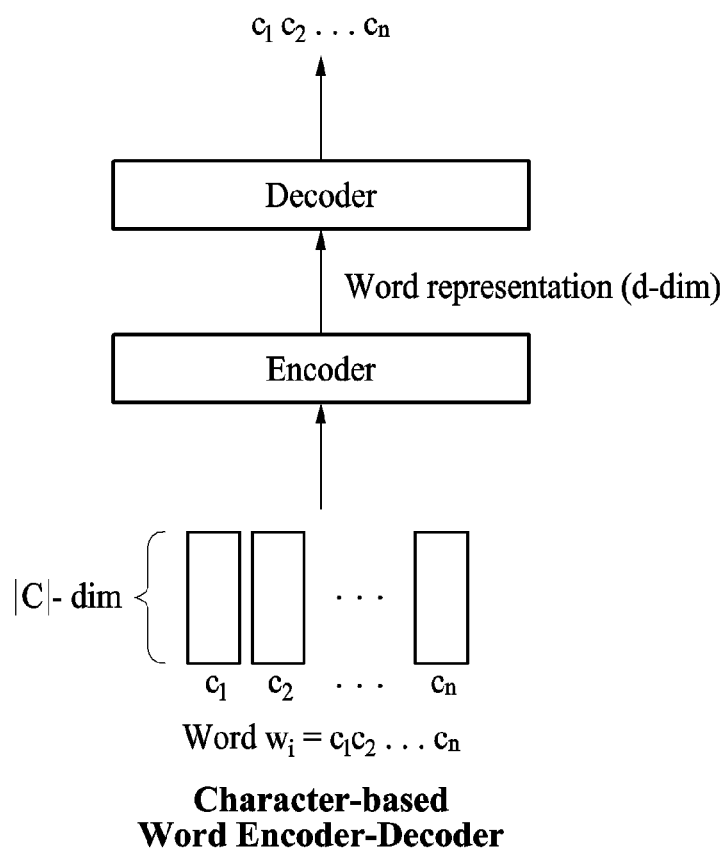
FIG. 4 is a diagram illustrating an example of a configuration of an encoder and a decoder to be trained, in accordance with an embodiment.

FIG. 4 is a diagram illustrating an example of a configuration of an encoder and a decoder to be trained, in accordance with an embodiment.

To train a model that encodes an input sequence of characters forming an input word and regenerates a sequence of the original characters of the input word from a result of the encoding, a feature vector that represents the input word may be generated. As illustrated in FIG. 4, an encoder and decoder (encoder-decoder) structure may be configured to generate the feature vector.

An encoder may sequentially receive characters included in an input word. Referring to FIG. 4, an input sequence of characters included in an input word is $w_i = c_1 c_2 \ldots c_n$, and vectors representing respective characters are of dimension c. The encoder receives the input sequence $w_i = c_1 c_2 \ldots c_n$, and generates a feature vector of dimension d corresponding to the input word. The d-dimension feature vector may be a real-valued vector. In this example, d is considerably smaller than a dimension $|V|$, for example, one million, of vocabularies to be processed in a language model ($d<<|V|$). The dimension $|V|$ of vocabularies to be processed in the language model is a number of words that is predictable by the language model. A decoder is trained to generate a sequence of the original characters, $c_1 c_2 \ldots c_n$, by receiving the d-dimension feature vector generated by the encoder.

In an example, a last softmax layer of an RNN of the decoder generates a probability corresponding to each character, and the generated probability value is fed forward again to an input layer of the RNN of the decoder. The last softmax layer of the decoder generates a probability corresponding to a character at a subsequent point in time based on a value transferred from the encoder and a value fed forward to the decoder. When such feeding forward is sequentially performed on the decoder, an error between a value generated by the last softmax layer for each point in time and a target value is corrected downwards through back propagation to train a neural network of the decoder.

The encoder and the decoder are embodied as an RNN having m layers. When training the encoder and the decoder, an input of the encoder and an output of the decoder may be a $|C|$-dimension one-hot vector in which a value of a vector element corresponding to each character is, for example, 1 and a value of a remaining vector element is, for example, 0. Here, C denotes a set of characters. For example, when a language to which the characters belong is English, C may be 26 alphabets.

A last hidden layer of the RNN of the encoder has d RNN units. When a sequence of characters included in an input word is input to an input layer of the RNN of the encoder, activation values to be generated by the last hidden layer or an output layer of the encoder are used as a feature vector that represents the input word.

In an embodiment, the input layer of the RNN of the decoder has d RNN units, and an output layer of the RNN of the decoder has C RNN units. When a d-dimension feature vector is input to the input layer of the RNN of the decoder, the output layer of the RNN of the decoder sequentially generates the activation values and the decoder is trained such that the activation values sequentially generated by the output layer represent the sequence of the characters included in the input word. As described above, when configuring and training a model of the RNN of the encoder and the decoder, an input and an output of the encoder and the decoder may be performed by a character processor, and, as a result, a feature vector of a word to be added may be represented without a structural change in the model despite the addition of a new word.

Figure 5:
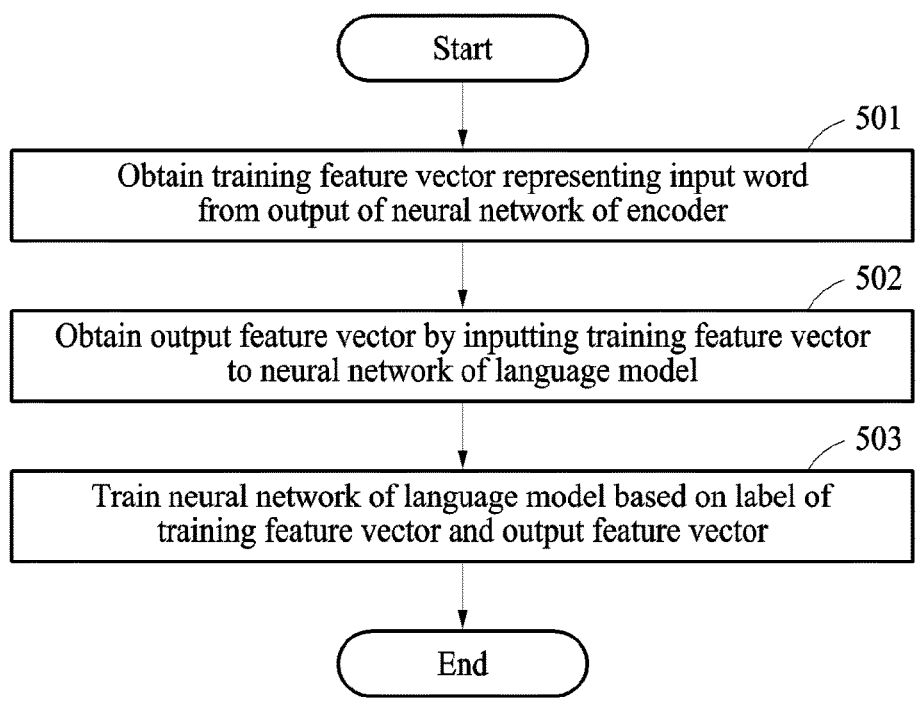
FIG. 5 is a flowchart illustrating an example of a process of training a neural network of a language model, in accordance with an embodiment.

FIG. 5 is a flowchart illustrating an example of a process of training a neural network of a language model, in accordance with an embodiment.

Referring to FIG. 5, in operation 501, in a training method of a language processing apparatus, the language processing apparatus obtains a training feature vector representing an input word (or training word) from an output of a neural network of an encoder. The training feature vector is obtained from a trained neural network of the encoder. An output layer of the trained neural network of the encoder generates the training feature vector representing the input word to be in a form of a real-valued vector. For example, the output layer of the trained neural network of the encoder includes d nodes, where d denotes a natural number. The d nodes output real values, and a d-dimension real-valued vector is generated based on activation values output from the d nodes. The real-valued vector is a d-dimension vector formed by a combination of real values.

In operation 502, the language processing apparatus obtains an output feature vector by inputting the training feature vector obtained from the neural network of the encoder to a neural network of a language model. For example, each node in an output layer of the neural network of the language model outputs a real value, and the output feature vector that is a real-valued vector is generated based on an activation value output from each node. When the neural network of the encoder is trained to enable an output of the neural network of the encoder to correspond to a d-dimension real-valued vector representing the input word and a neural network of a decoder is trained to enable an input of the neural network of the decoder to correspond to a d-dimension real-valued vector representing a predicted word, the neural network of the language model is trained to enable an input and an output of the neural network of the language model to correspond to a d-dimension real-valued vector.

The neural network of the language model may be an RNN. Thus, the RNN of the language model generates the output feature vector based on the training feature vector and hidden state values.

In operation 503, the language processing apparatus trains the neural network of the language model based on a label of the input word (or training word), for example, a label of the training feature vector, and based on the output feature vector. In an embodiment, the output feature vector is a vector that represents the predicted word associated with the input word, and is a real-valued vector. The predicted word is a word subsequent to the input word.

The label of the training feature vector may be variously applied to be suitable to a designing intention and accordingly defined. For example, when training the neural network of the language model to generate a natural sentence used in a real life, the label of the training feature vector is defined so that the predicted word is to be grammatically or semantically suitable to follow the input word. For example, when training the neural network of the language model to generate a creative work, for example, a poem and a novel, the label of the training feature vector is defined so that the predicted word is to be suitable to generate a new sentence that is not previously present.

For example, when training the neural network of the language model to provide a translation between different languages, the label of the training feature vector is defined so that the predicted word is to correspond semantically to the input word. In such an example, when a dimension of the input layer of the neural network of the encoder corresponds to the number of types of characters of a first language, a dimension of the output layer of the neural network of the decoder corresponds to the number of types of characters of a second language. For example, to consider a word order or a grammatical characteristic of a language, the label of the training feature vector is defined to enable the neural network of the language model to receive feature vectors representing input words in a unit of a sentence, a phrase, or a paragraph, and to output feature vectors representing predicted words in the unit of the sentence, the phrase, or the paragraph. That is, characters that are processed in the encoder and the decoder may be associated with or correspond to different languages, and the neural network of the language model is configured to be suitable for an output of the encoder and an input of the decoder, and trained accordingly.

Figure 6:
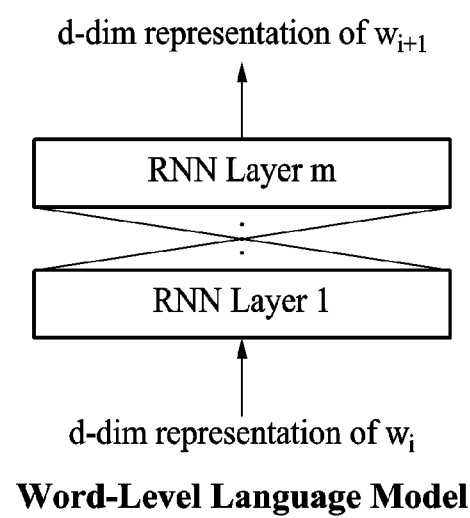
FIG. 6 is a diagram illustrating an example of a configuration of a neural network of a language model to be trained, in accordance with an embodiment.

FIG. 6 is a diagram illustrating an example of a configuration of a neural network of a language model to be trained, in accordance with an embodiment.

A neural network of a language model is trained to generate a d-dimension real-valued vector representing a predicted word based on a d-dimension real-valued vector obtained from an encoder. As illustrated in FIG. 6, an RNN of the language model including a plurality of RNN layers may be applied.

Referring to FIG. 6, a feature vector representing each word obtained through a trained encoder and decoder (encoder-decoder), for example, a d-dimension real-valued vector, may be used as an input and output to train a word-level RNNLM. When a feature vector of an i-th word $w_i$ is input, an RNNLM, which is trained based on the feature vector obtained from the encoder and the decoder, outputs a d-dimension real-valued vector that is close to a feature vector of an i+1 th word $w_{i+1}$. That is, a dimension of the input and a dimension of the output corresponds to a d dimension, which is considerably smaller than the number of words predictable by a language model, for example, vocabularies included in a predefined dictionary. As a result, a size of the RNNLM may not depend on a size of the dictionary and also an amount of time to train and estimate a predicted word may be considerably reduced. In addition, the training may be performed based on a word level, not a character level, to generate a predicted word associated with an input word, which results in readily training a pattern of a word sequence.

Figure 7:
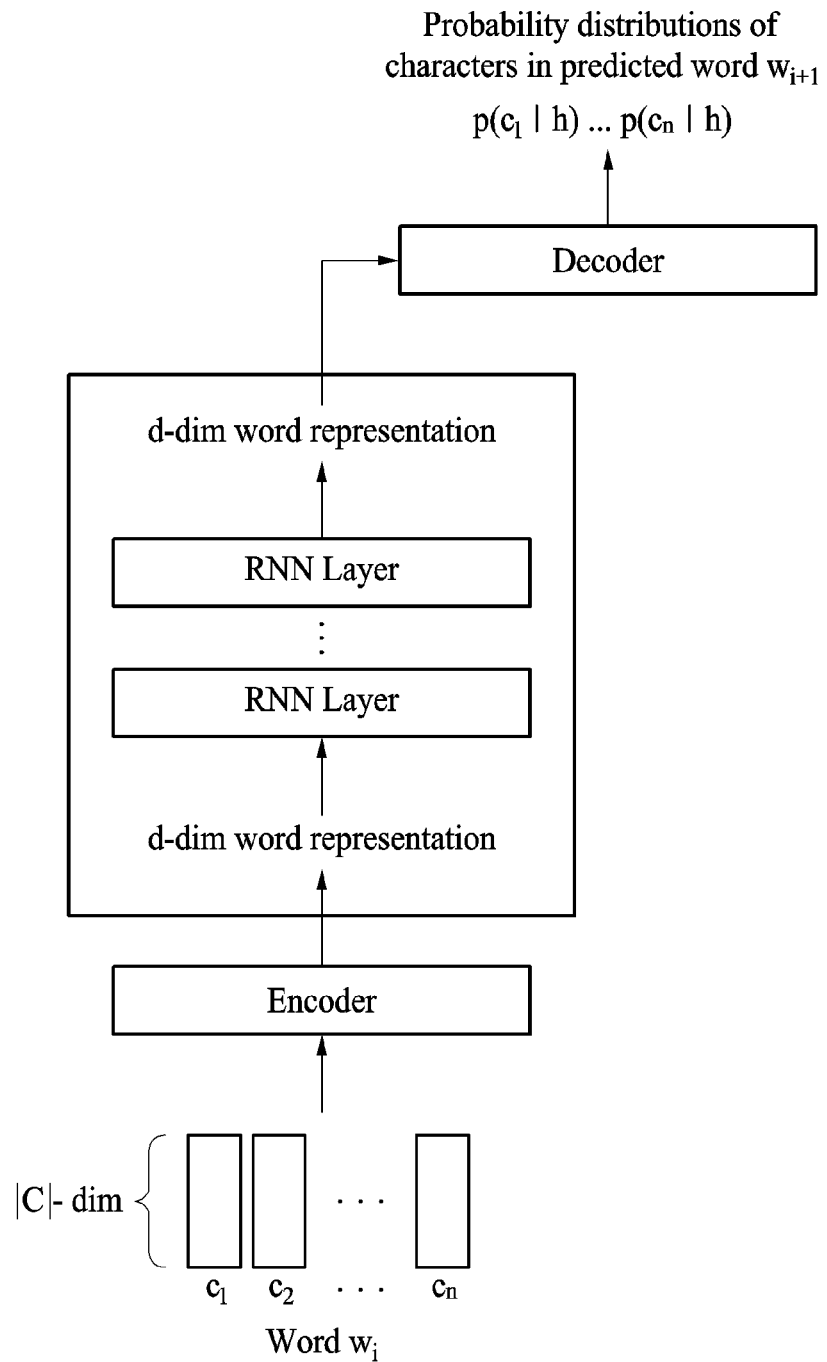
FIG. 7 is a diagram illustrating an example of a configuration of a network in which respective recurrent neural networks (RNNs) of an encoder, a decoder, and a language model are integrated, in accordance with an embodiment.

FIG. 7 is a diagram illustrating an example of a configuration of a network in which RNNs of an encoder, a decoder, and a language model are integrated, in accordance with an embodiment.

When an RNNLM is applied as an input and output, a d-dimension feature vector generated through an encoder and a decoder is trained. The RNNLM outputs a d-dimension real-valued vector. To determine a word corresponding to the real-valued vector output from the RNNLM, a similarity between the output real-valued vector and respective feature vectors of all words may need to be calculated.

In an example, the decoder is integrated with an output end of the RNNLM. The decoder integrated with the output of the RNNLM sequentially outputs probabilities of characters included in a predicted word. To improve inefficiency in calculating similarities with all words to estimate the predicted word, the decoder configured to output a probability corresponding to each character of the predicted word is adopted.

Figure 8:
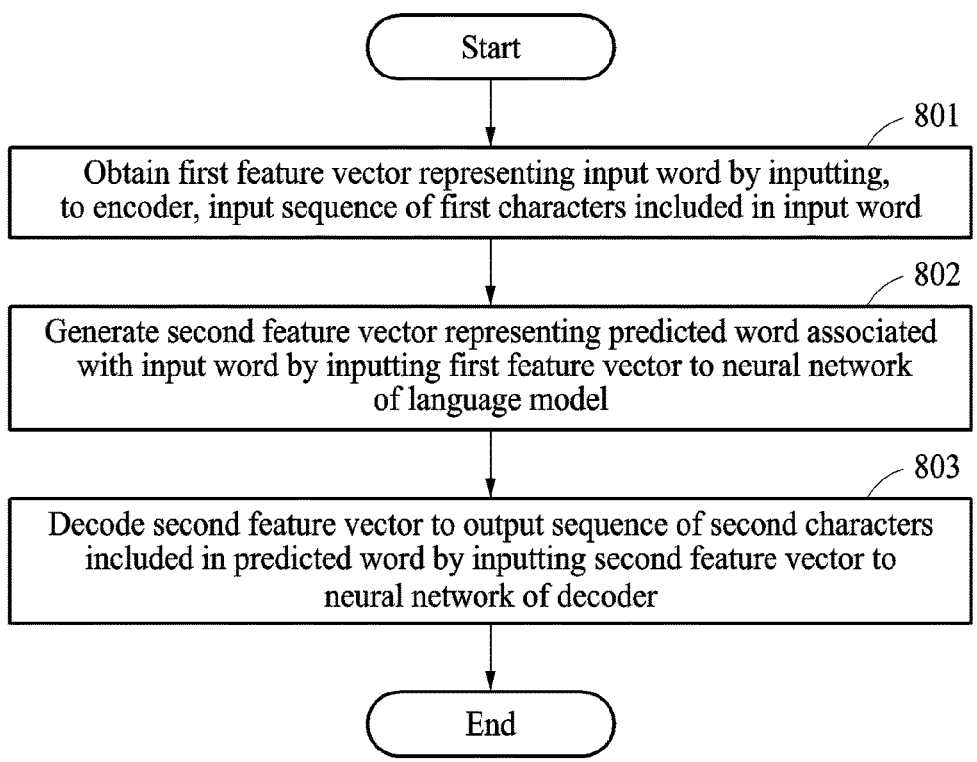
FIG. 8 is a flowchart illustrating an example of a language processing method, in accordance with an embodiment.

In this example, the encoder is integrated with an input end of the RNNLM. Alternatively, a feature vector representing an input word is obtained from a lookup table in lieu of the encoder. In such a case, a language processing apparatus refers to the lookup table to obtain the feature vector corresponding to the input word, and inputs the feature vector to the input end of the RNNLM. When the feature vector representing the input word is not obtained from the lookup table, the feature vector representing the input word is obtained through a neural network of the encoder. FIG. 8 is a flowchart illustrating an example of a language processing method, in accordance with an embodiment. In an embodiment, the language processing method may be performed by a language processing apparatus.

Referring to FIG. 8, in operation 801, the language processing apparatus obtains a first feature vector representing an input word by inputting an input sequence of first characters included in the input word. In an example, an RNN trained as described with reference to FIGS. 3 through 7 may be applicable to an encoder.

The input sequence is input to a neural network of the encoder, and the encoder encodes the input sequence to the first feature vector. First vectors representing the first characters, respectively, are sequentially input to an input layer of the neural network of the encoder. An output layer of the neural network of the encoder generates activation values, and the first feature vector is generated based on the activation values that are sequentially generated. A dimension of the first feature vector corresponds to the number of nodes in the output layer of the neural network of the encoder.

A dimension of a first vector representing a first character among the first characters corresponds to the number of nodes in the input layer of the neural network of the encoder, and corresponds to the number of types of characters included in the input word for a particular language. The neural network of the encoder may be an RNN that includes a plurality of RNN layers. Thus, the first feature vector is generated based on the input sequence input to the input layer of the neural network of the encoder and on an output value previously generated by the RNN. The output value previously generated by the RNN includes a hidden state value of the RNN.

The input layer of the neural network of the encoder includes nodes corresponding to the number of the types of the characters included in the language to which the input word belongs. In such a case, each vector representing each character of the input word may be a one-hot vector, in which a value of a node corresponding to a character is 1, and a value of a remaining node is 0. When a sequence of one-hot vectors is input, the neural network of the encoder generates a d-dimension real-valued vector based on hidden state values of the RNN layers and the input sequence of the one-hot vectors. That is, the neural network of the encoder encodes the sequence input by a character unit to a real-valued vector. For example, the neural network of the encoder encodes, on the d-dimension real-valued vector (1.5, 5.894, 3246, 0.0546), the sequence of the one-hot vectors, for example, being (0,0,0,0,0,0,0,0,0,0,0,1,0,0,0,0,0,0,0,0,0,0,0,0),
(0,0,0,0,0,0,0,0,0,0,0,0,0,1,0,0,0,0,0,0,0,0,0,0),
(0,0,0,0,0,0,0,0,0,0,0,0,0,0,0,1,0,0,0,0,0,0,0,0), and
(0,0,0,0,1,0,0,0,0,0,0,0,0,0,0,0,0,0,0,0,0,0,0,0)

However, an example of such a real-valued vector may be applied or modified in various ways, and may be defined suitably to a configuration, an application, or an embodiment.

Alternatively, the encoder may refer to a lookup table to obtain the first feature vector. The lookup table may record therein a plurality of input sequences and a plurality of feature vectors corresponding to the input sequences, for example, "more" 4 (1.5, 5.894, 3246, 0.0546). The lookup table maps, to a feature vector, a sequence of characters included in a word. In some embodiments, an amount of time for processing may be relatively less by referring to the lookup table compared to an operation through the RNN of the encoder. In such a case, the encoder obtains the first feature vector based on the lookup table for effective processing. However, when such a lookup table-based obtainment of the first feature vector fails, the language processing apparatus inputs the input sequence to the neural network of the encoder and encode the input sequence to the first feature vector.

In operation 802, the language processing apparatus generates a second feature vector representing a predicted word associated with the input word by inputting the first feature vector to a neural network of a language model. The neural network of the language model may be an RNN or an RNNLM trained as described with reference to FIGS. 3 through 7.

The RNN of the language model generates the second feature vector based on the first feature vector and an output value previously generated by the RNN. For example, when a real-valued vector representing a word "more," for example, (1.5, 5.894, 3246, 0.0546), is input to an input layer of the RNNLM of the language model, an output layer of the RNNLM of the language model generates a real-valued vector similar to or substantially the same as a real-valued vector representing a predicted word "money" based on hidden state values of the RNNLM of the language model, for example, values representing "she," "may," and "earn," and on a currently input real-valued vector, for example, (1.5, 5.894, 3246, 0.0546).

The number of nodes in the input layer of the neural network of the language model corresponds to the dimension of the first feature vector. The number of nodes in the output layer of the neural network of the language model corresponds to a dimension of the second feature vector. In an example, when the encoder and a decoder are trained to input the feature vector generated by the neural network of the encoder to a neural network of the decoder, the dimension of the first feature vector and the dimension of the second feature vector are identical to or substantially the same as each other.

In operation 803, the language processing apparatus decodes the second feature vector to an output sequence of second characters included in the predicted word by inputting the second feature vector to the neural network of the decoder. An RNN trained, as described with reference to FIGS. 3 through 7, may be applied to the decoder.

The dimension of the second feature vector corresponds to the number of nodes in an input layer of the neural network of the decoder, and a dimension of a second vector representing a second character among the second characters corresponds to the number of nodes in an output layer of the neural network of the decoder. The dimension of the second vector corresponds to the number of types of characters included in a language to which the predicted word belongs. The second vector is generated based on activation values generated by the output layer of the neural network of the decoder, and the generated activation values represent or indicate a probability corresponding to a second character.

In an example, the neural network of the decoder is an RNN, and the language processing apparatus generates an output sequence based on the second feature vector and an output value previously generated by the RNN. The output sequence is generated based on the activation values sequentially generated by the output layer of the neural network of the decoder.

The second feature vector is a real-valued vector representing the predicted word, or a real-valued vector similar to the real-valued vector corresponding to the predicted word. For example, when a predicted word is "money," the decoder decodes the second feature vector to an output sequence of "m," "o," "n," "e," and "y." When the neural network of the language model generates a feature vector that accurately represents the predicted word "money," the output layer of the neural network of the decoder outputs a sequence of one-hot vectors representing "m," "o," "n," "e," and "y," as follows.

"m"→(0,0,0,0,0,0,0,0,0,0,0,1,0,0,0,0,0,0,0,0,0,0,0,0),
"o"→(0,0,0,0,0,0,0,0,0,0,0,0,0,1,0,0,0,0,0,0,0,0,0,0),
"n"→(0,0,0,0,0,0,0,0,0,0,0,0,1,0,0,0,0,0,0,0,0,0,0,0),
"e"→(0,0,0,0,1,0,0,0,0,0,0,0,0,0,0,0,0,0,0,0,0,0,0,0), and
"y"→(0,0,0,0,0,0,0,0,0,0,0,0,0,0,0,0,0,0,0,0,0,0,1,0)

Also, the neural network of the language model generates a real-valued vector similar to the feature vector that accurately represents the predicted word "money." In such a case, each node in the output layer of the neural network of the decoder sequentially generates probability values corresponding to "m," "o," "n," "e," and "y," respectively, as follows as one example:

"m"→(0,0,0,0.004,0,0,0.04,0,0,0,0,0,0.94,0,0,0,0,0,0,0,0,0,0,0),
"o"→(0,0,0,0,0,0,0,0,0,0,0,0,0,0.886,0,0,0,0,0,0,0,0,0,0),
"n"→(0,0,0,0,0,0,0,0,0.003,0,0,0,0.977,0,0,0,0,0,0,0,0,0,0,0),
"e"→(0,0,0,0,0.9923,0,0,0,0,0.0041,0,0,0,0,0,0,0,0,0,0,0,0,0,0), and
"y"→(0,0,0,0,0,0,0,0,0,0,0,0,0.008,0,0,0,0,0,0,0,0,0,0.997,0)

Figure 9:
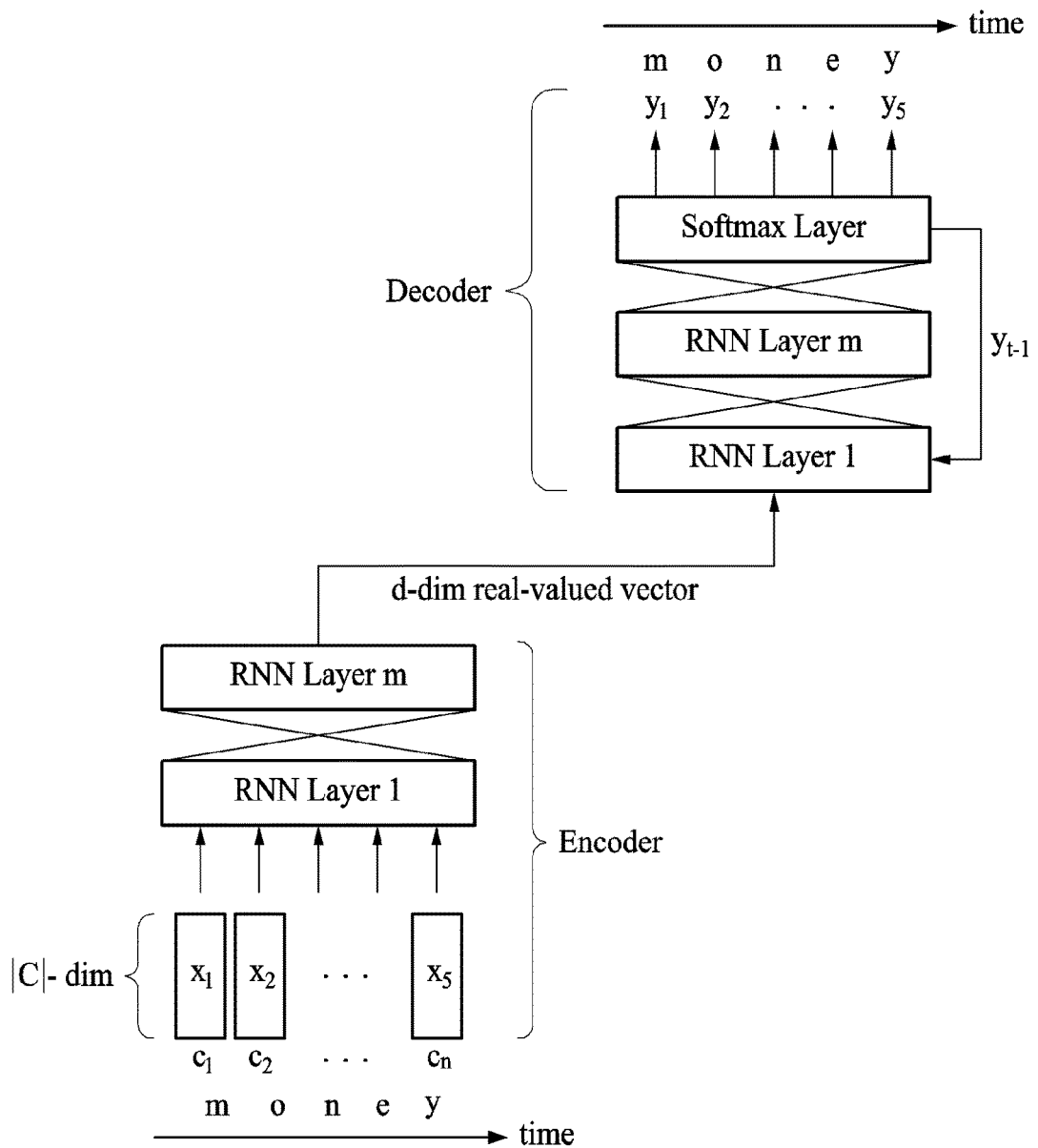
FIG. 9 is a diagram illustrating an example of an encoder and a decoder, in accordance with an embodiment.

FIG. 9 is a diagram illustrating an example of an encoder and a decoder, in accordance with an embodiment.

A network structure of a character-based encoder and decoder (encoder-decoder) may be provided herein. Referring to FIG. 9, a word "money" is encoded and decoded by the character-based encoder and decoder. When one-hot vectors corresponding to "m," "o," "n," "e," and "y" are sequentially input to the encoder, an activation value of a last RNN layer of an RNN of the encoder is input to the decoder.

A target output of the decoder may be sequential, one-hot vectors that correspond to the characters "m," "o," "n," "e," and "y," and the decoder performs the decoding using a value transferred from the encoder and an output value at each point in time. For example, as illustrated in FIG. 9, at a point in time $t_3$, RNN layer 1 of the decoder is fed forward a one-hot vector corresponding to a character "o" ($y_2$) and a softmax layer of the decoder generates an one-hot vector corresponding to "n" ($y_3$), based on a value transferred from the encoder and the one-hot vector corresponding to "o" ($y_2$), which is fed forward. In such a manner, the decoder performs sequential feed forwarding, and the softmax layer of the decoder sequentially generates probability values corresponding to the characters.

Figure 10:
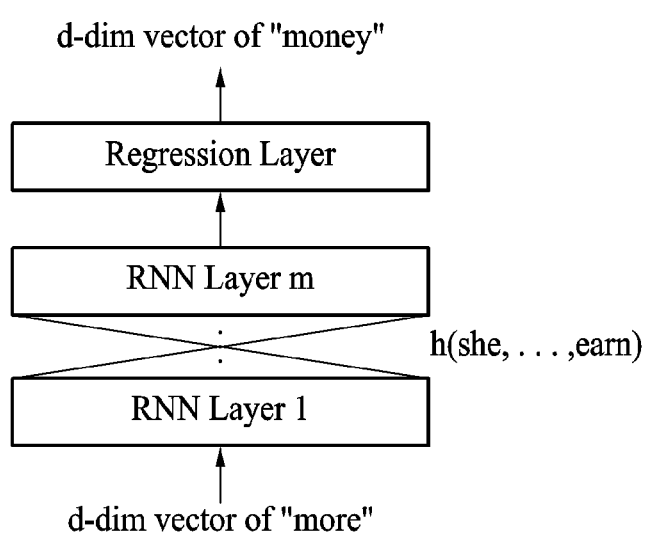
FIG. 10 is a diagram illustrating an example of a neural network of a language model, in accordance with an embodiment.

FIG. 10 is a diagram illustrating an example of a neural network of a language model, in accordance with an embodiment.

A structure of an RNNLM is described using, as an input and output, a feature vector of a word generated through a character-based encoder and decoder. Referring to FIG. 10, an input and output of the RNNLM for generation of a sentence "she may earn more money" corresponds to a d-dimension real-valued vector. For example, as illustrated in FIG. 10, a d-dimension real-valued vector representing a word "more", which is transferred from the encoder at a point in time $t_5$, is input to the RNNLM. The RNNLM generates a d-dimension real-valued vector representing a word "money," based on an output value fed forward at each point in time and a value transferred from the encoder. Because the RNNLM outputs the d-dimension real-valued vector, a layer immediately prior to an output layer is embodied or configured as a regression layer.

Figure 11:
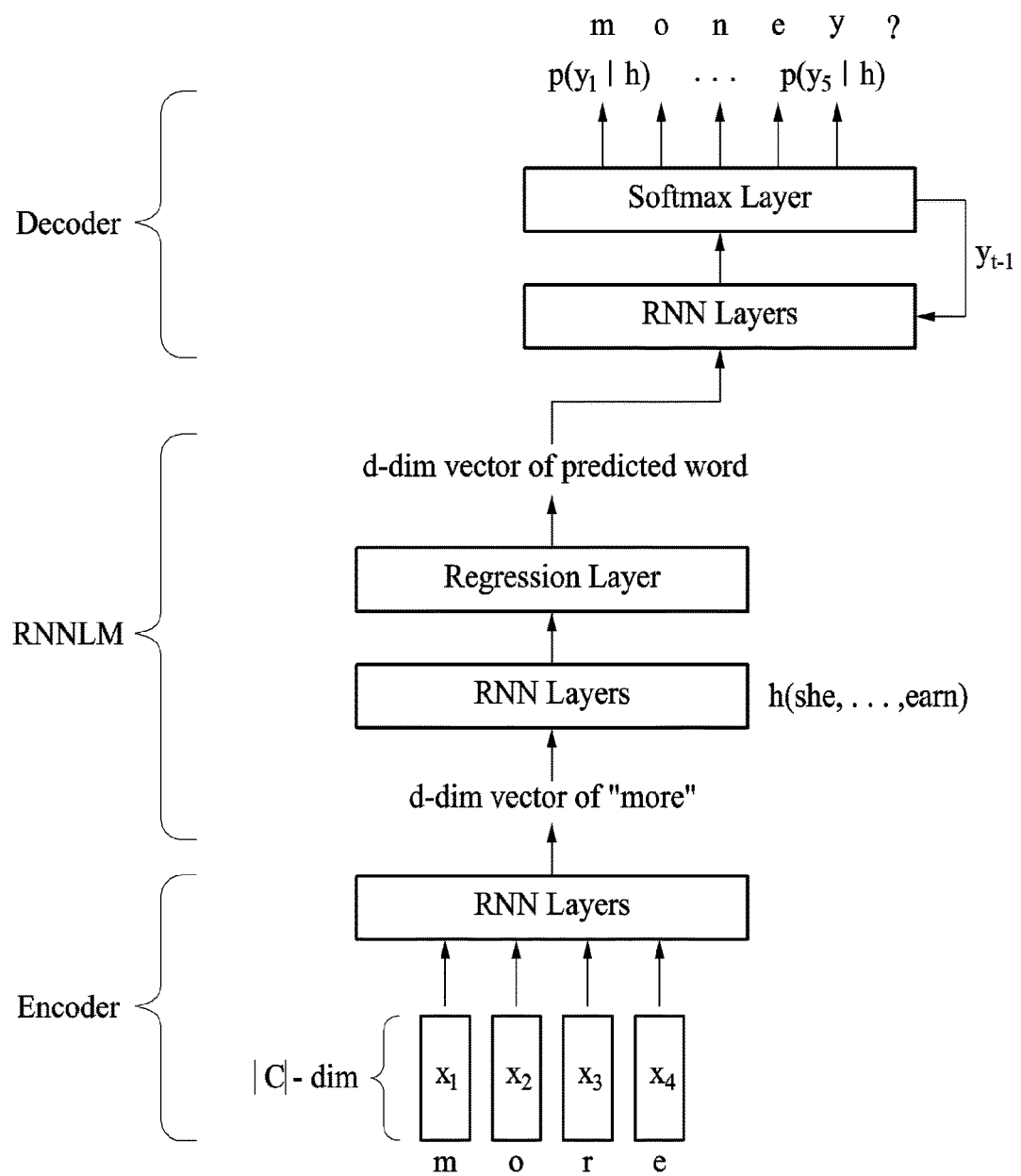
FIG. 11 is a diagram illustrating an example of a neural network of a language model in which an encoder and a decoder are integrated, in accordance with an embodiment.

FIG. 11 is a diagram illustrating an example of a neural network of a language model in which an encoder and a decoder are integrated, in accordance with an embodiment.

An integrated model is described in which an encoder is integrated at an input end of a word-based RNNLM and a decoder is integrated at an output end of the word-based RNNLM. Referring to FIG. 11, a sequence of characters "m," "o," "r," and "e" is input to a language processing apparatus of the model in which the encoder, a language model, and the decoder are integrated. As a result, the language processing apparatus outputs probability values corresponding to characters included in a predicted word, in order of the characters.

Figure 12:
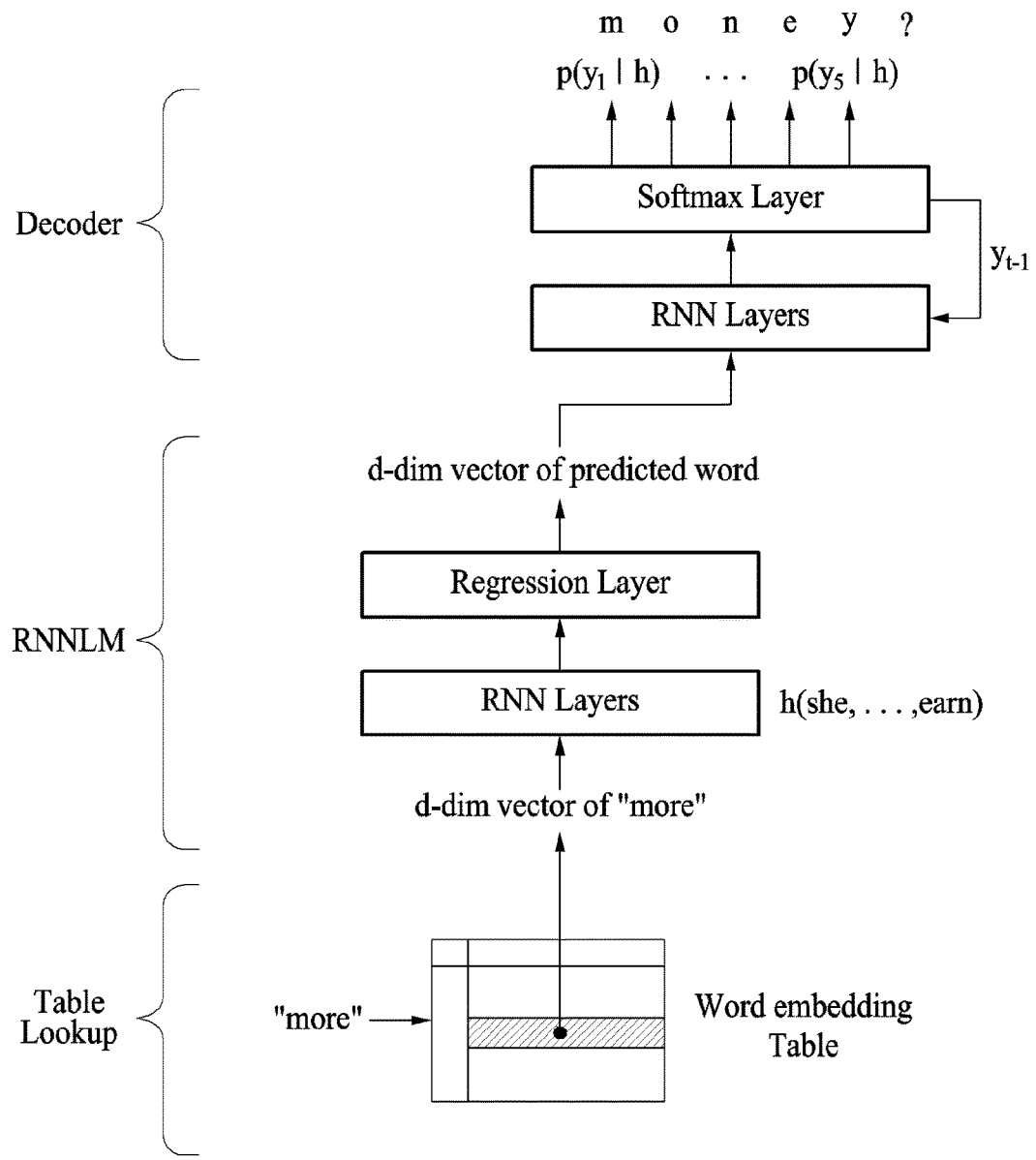
FIG. 12 is a diagram illustrating another example of a neural network of a language model in which an encoder and a decoder are integrated, in accordance with an embodiment.

FIG. 12 is a diagram illustrating another example of a neural network of a language model in which an encoder and a decoder are integrated, in accordance with an embodiment.

A model is described that generates a feature vector representing an input word using a lookup table of an encoder in lieu of a neural network of the encoder. Referring to FIG. 12, a language processing apparatus stores a lookup table recording or storing therein, in advance, a d-dimension feature vector, for example, a real-valued vector, for each word. The language processing apparatus refers to the lookup table, instead of integrating the encoder at an input end of a word-based RNNLM, to input the d-dimension feature vector to the input end of the RNNLM. The operations of the language processing apparatus described with reference to FIG. 2A and FIG. 2B may be applicable to examples described with reference to FIGS. 8 through 12, and the trained neural networks of the encoder, the decoder, and the language model described with reference to FIGS. 3 through 7 may be applicable to examples described with reference to FIGS. 8 through 12.

The apparatuses, encoders, word estimators, decoders, modules, devices, and other components illustrated in FIGS. 1, 2A and 2B, 4, 6, 7, 9, 10, 11, and 12 that perform the operations described herein with respect to FIGS. 3, 5, and 8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3, 5, and 8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 5, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A language processing method, comprising:
    obtaining, using an encoder, a first feature vector representing an input word based on an input sequence of first characters of alphabet letters included in the input word;
    generating, using a word estimator, a second feature vector representing a predicted word associated with the input word by processing the first feature vector using a language model, the first feature vector being output from the encoder and input to the language model; and
    decoding, using a decoder, the second feature vector to an output sequence of second characters included in the predicted word using the second feature vector.

2. The method of claim 1, wherein either one or both of the first feature vector and the second feature vector is a d-dimension real-valued vector formed by a combination of real values,
    wherein d is a natural number smaller than a number of words predictable by the language model.

3. The method of claim 1, wherein the obtaining of the first feature vector comprises:
    encoding the input sequence to the first feature vector at a neural network of the encoder.

4. The method of claim 3, wherein the obtaining of the first feature vector comprises:
    sequentially inputting first vectors representing, respectively, the first characters to an input layer of the neural network of the encoder; and
    generating the first feature vector based on activation values to be sequentially generated by an output layer of the neural network of the encoder,
    wherein a dimension of the first feature vector corresponds to a number of nodes of the output layer.

5. The method of claim 3, wherein a dimension of a first vector representing a first character, among the first characters, corresponds to either one or both of a number of nodes of an input layer of the neural network of the encoder and a number of types of characters included in a language of the input word.

6. The method of claim 3, wherein the neural network of the encoder comprises a recurrent neural network, and
    the obtaining of the first feature vector comprises:
    generating the first feature vector based on the input sequence and an output value previously generated by the recurrent neural network.

7. The method of claim 1, wherein the obtaining of the first feature vector comprises:
    obtaining the first feature vector representing the input word from a lookup table in which input sequences and feature vectors corresponding to the input sequences are recorded.

8. The method of claim 1, wherein the obtaining of the first feature vector further comprises:
    encoding the input sequence to the first feature vector by inputting the input sequence to a neural network of the encoder.

9. The method of claim 1, wherein the predicted word comprises a word subsequent to the input word.

10. The method of claim 1, wherein a neural network of the language model comprises a recurrent neural network, and
    the generating of the second feature vector comprises:
    generating the second feature vector based on the first feature vector and an output value previously generated by the recurrent neural network.

11. The method of claim 1, wherein a dimension of the first feature vector corresponds to a number of nodes of an input layer of a neural network of the language model, and a dimension of the second feature vector corresponds to a number of nodes of an output layer of the neural network of the language model.

12. A language processing method, comprising:
    obtaining, using an encoder, a first feature vector representing an input word based on an input sequence of first characters of alphabet letters included in the input word;
    generating, using a word estimator, a second feature vector representing a predicted word associated with the input word by processing the first feature vector using a language model; and decoding, using a decoder, the second feature vector to an output sequence of second characters included in the predicted word using the second feature vector, wherein a dimension of the second feature vector corresponds to a number of nodes of an input layer of a neural network of the decoder, and a dimension of a second vector representing a second character, among the second characters, corresponds to a number of nodes of an output layer of the neural network of the decoder, wherein the dimension of the second vector corresponds to a number of types of characters included in a language of the predicted word.

13. The method of claim 12, wherein the second vector is generated based on activation values generated by the output layer of the neural network of the decoder, wherein one of the activation values indicates a probability corresponding to the second character.

14. The method of claim 1, wherein a neural network of the decoder comprises a recurrent neural network, and the decoding comprises:

generating the output sequence based on the second feature vector and an output value previously generated by the recurrent neural network.

15. The method of claim 1, wherein the decoding comprises:

generating the output sequence based on activation values to be sequentially generated by an output layer of a neural network of the decoder.

16. A non-transitory computer-readable storage medium storing instructions that, when executed by a processor, cause the processor to perform the method of claim 1.

17. A training method, comprising:

processing a training sequence of training characters of alphabet letters included in a training word at a neural network of an encoder to produce a training feature vector representing the training word;

processing the training feature vector at a neural network of a language model to produce an output feature vector, the training feature vector being output from the neural network of the encoder and input to the neural network of the language model;

processing the output feature vector at a neural network of a decoder to produce an output sequence corresponding to the training sequence; and training the neural network of the language model based on a label of the training word and the output sequence.

18. The training method of claim 17, wherein either one or both of the training feature vector and the output feature vector is a d-dimension real-valued vector formed by a combination of real values, wherein d is a natural number smaller than a number of words predictable by the language model, and the training of the neural network of the language model comprises:

training the neural network of the language model to represent, through the output feature vector, a predicted word associated with the training word.

19. A training method, comprising:

processing a training sequence of training characters of alphabet letters included in a training word at a neural network of an encoder to produce a training feature vector representing the training word;

processing the training feature vector at a neural network of a language model to produce an output feature vector;

processing the output feature vector at a neural network of a decoder to produce an output sequence corresponding to the training sequence; and training the neural network of the language model based on a label of the training word and the output sequence, wherein the training method further comprises:

obtaining a second output sequence corresponding to the training sequence by inputting the training feature vector to the neural network of the decoder; and training the neural network of the encoder and the neural network of the decoder based on the label of the training word and the second output sequence.

20. The training method of claim 19, wherein a training vector included in the training sequence is a c-dimension one-hot vector, wherein c is a natural number, and a value of a vector element corresponding to the training character is 1 and a value of a remaining vector element is 0, and the training comprises:

training the neural network of the encoder and the neural network of decoder such that the training sequence and the second output sequence are identical to each other.

21. A non-transitory computer-readable storage medium storing instructions that, when executed by a processor, cause the processor to perform the method of claim 17.

22. A language processing apparatus, comprising:

a processor configured to:

generate, using an encoder, a first feature vector representing an input word based on an input sequence of first characters of alphabet letters included in the input word;

generate a second feature vector representing a predicted word, associated with the input word, based on the first feature vector using a language model, the first feature vector being output from the encoder and input to the language model; and generate, using a decoder, an output sequence of second characters included in the predicted word based on the second feature vector.

* * * * *